April 30, 1963 T. B. KEESLING 3,087,613
FRUIT FEED OUTLET
Filed Nov. 25, 1960 2 Sheets-Sheet 1
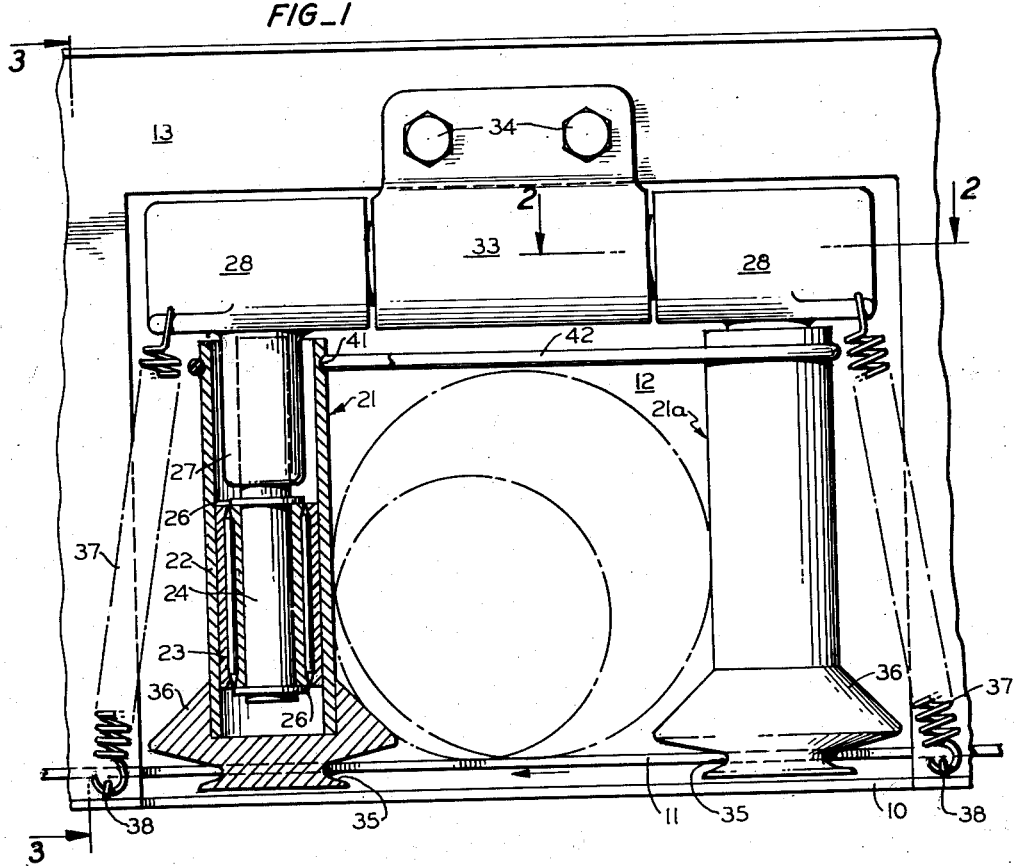
FIG_1
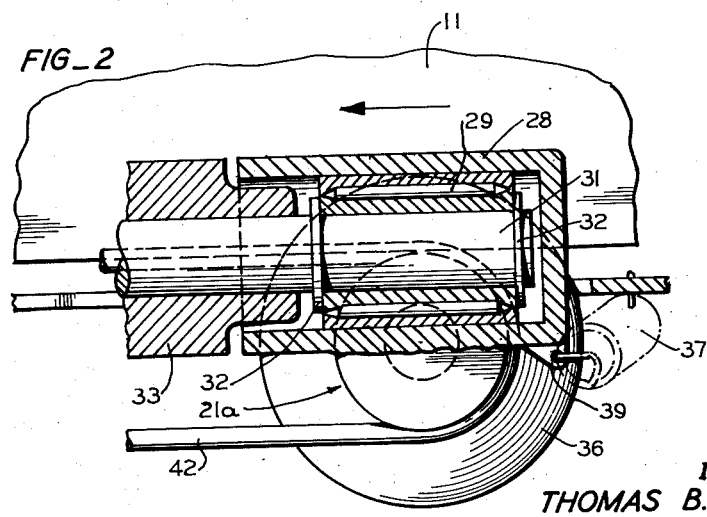
FIG_2
INVENTOR.
THOMAS B. KEESLING
BY Allen and Chromy
ATTORNEYS April 30, 1963 T. B. KEESLING 3,087,613
FRUIT FEED OUTLET
Filed Nov. 25, 1960 2 Sheets-Sheet 2
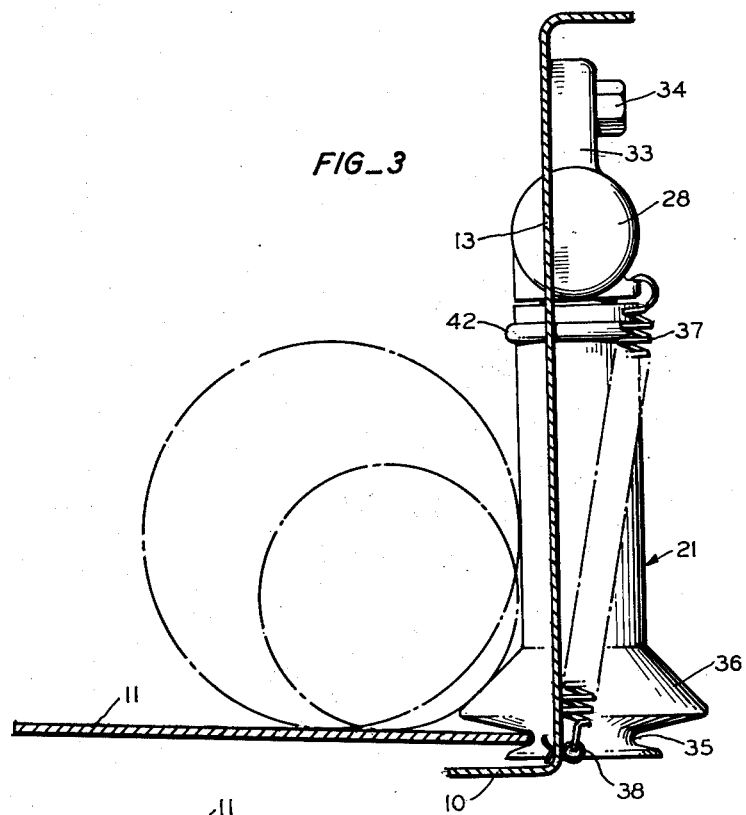
FIG_3
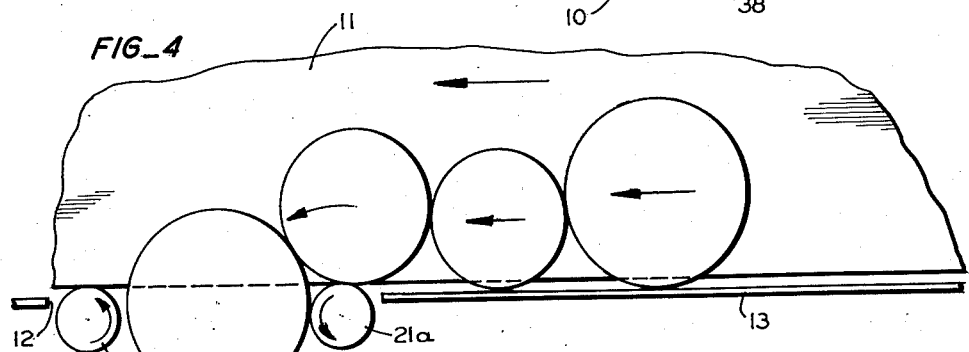
FIG_4
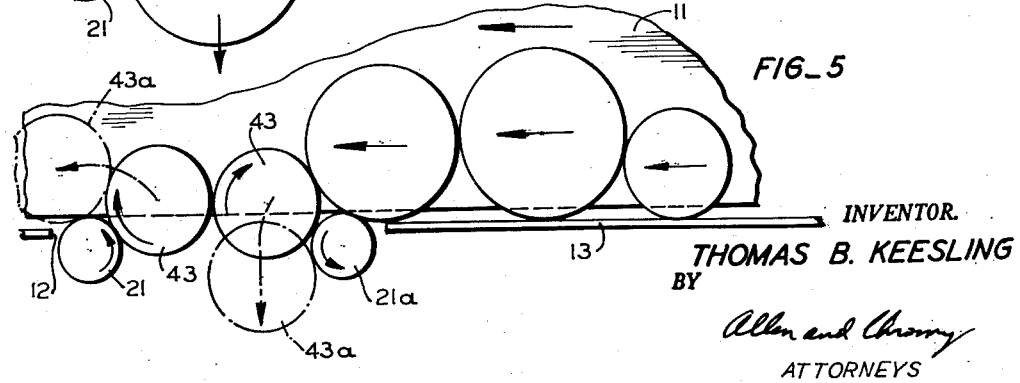
FIG_5
INVENTOR.
THOMAS B. KEESLING
BY
Allen and Chromy
ATTORNEYS /# 3,087,613
FRUIT FEED OUTLET
Thomas B. Keesling, 16181 Jacaranda Way,
Los Gatos, Calif.
Filed Nov. 25, 1960, Ser. No. 71,497
6 Claims. (Cl. 209—74)

The present invention relates to bulk fruit conveyors and to feeding fruit therefrom as a single file and is concerned more particularly with means for preventing or relieving any bridging of the exit opening.

It is a general object of the invention to provide for the bulk feeds of fruit or the like articles and to provide an exit opening which is related to the size of the articles being handled so as to provide for exit of the articles one-by-one and to prevent bridging or jamming of the opening by two articles trying to exit at the same time.

It is a further object of the invention to provide a so-called "merry-go-round" conveyor provided with an exit opening in which the top, the bottom, the downstream side and the upstream side of the exit opening are defined by movable means to relieve jamming or bridging of the opening so that all sides of the opening have live surfaces.

It is another object of the invention to provide an exit opening in a bulk feed conveyor having roller means defining the upstream and downstream sides thereof in which each of the rollers is provided with means to be driven by the belt of the conveyor, and in which the rollers are connected so that each drives the other if the drive to one of the rollers should fail.

Other objects and advantages of the invention will be apparent from the following description of a preferred embodiment thereof, made with reference to the accompanying drawings, in which:

FIG. 1 is a fragmentary side elevational view of a bulk conveyor embodying an exit opening constructed in accordance with the instant invention;

FIG. 2 is a fragmentary sectional view taken in a plane indicated by the line 2—2 in FIG. 1;

FIG. 3 is a schematic sectional view taken as indicated by the line 3—3 in FIG. 1;

FIG. 4 is a schematic plan view illustrating the operation of the roller means defining the exit opening in connection with a large piece of fruit;

FIG. 5 is a view similar to FIG. 4 and illustrating the operation of the exit opening in connection with a pair of smaller pieces of fruit which are of the size to tend to bridge said opening.

The present invention relates to the feeding of bulk fruit such as found for example in conventional "merry-go-round" feeds, wherein the fruit is carried in a circulating path past a feed opening through which a single file feed is desired for feeding to suitable processing apparatus.

In this instance, the conveyor structure includes a frame 10, upon which a bulk feed conveyor 11 of the belt type is suitably mounted for movement in the direction of the arrow in FIG. 1 past an exit opening 12 in a side wall 13. The articles may be urged toward the opening by any suitable means such as, for example, by inclining the conveyor belt as indicated in FIG. 3 or providing a suitable transverse member extending across the conveyor belt.

The respective downstream and upstream sides of the opening are defined by upright movable conveyor means in the form of respective rollers 21 and 21a. Each roller includes a sleeve 22 (FIG. 1) journaled by a suitable bearing 23 on the depending shaft 24 between a pair of retaining rings 26. The shaft 24 of each roller is press-fitted in a depending bar 27 of a support casting 28. Each casting 28 (FIG. 2) has mounted therein a bearing 29 which is journaled on a stub shaft 31 between suitable retainer rings 32. The center portion of the shaft 31 is secured in a bracket 33 which is fastened to the side wall 13 by a pair of fastening bolts or screws 34 (FIG. 1). At the lower end of each sleeve 22 of a roller 21 there is mounted a pulley or drive wheel 36, which has a tapering drive groove 35 adapted to engage the edge of the belt 11 under the urgency of a spring 37, which extends between a suitable fastening 38 in the side wall 13 and an aperture 39 in an overhanging portion of the adjacent support casting 28. In this way, each roller 36 is urged toward the belt 11 and will engage the same irrespective of variations in the width of the belt 11 or in variation of its location on the frame 10.

The respective rollers 21 and 21a are provided with a connecting drive so that, although normally each roller receives an independent drive from the belt 11, if one roller happens to be out of engagement with the belt its drive will be continued by this inter-connection. For this purpose, each roller is provided adjacent its upper end with an annular groove 41 and a suitable connecting belt such as a rubber O-ring 42 is engaged with these grooves so that the rollers are driven one by the other and also by the belt 11.

Normally both rollers will always be driving in the direction indicated by the arrow in FIG. 4. It will be noted, referring to FIG. 1 that the belt 42 provides a live upper limit for the size of fruit which will pass through the opening so that extra large fruit will be diverted past the opening and so that in a pile-up the upper fruit will be moved past the opening.

It will also be noted that the direction of the roller 21a in FIG. 4 is such that it tends to encourage the movement of the fruit into the exit opening. Also, the direction of rotation of the roller 21 on the downstream side of the opening is such that it tends to cause one of a pair of bridging fruit 43 in the opening to move out of the opening as indicated at 43a. In addition to the rolls 21 and 21a the belt or O-ring 42 and the main belt 11 provide live surfaces at every side of the exit opening thereby effectively preventing jamming or bridging of the opening.

While I have shown a preferred form of the invention, it will be apparent that the invention is capable of variation and modification from the form shown so that its scope should be limited only by the proper scope and the claims appended hereto.

I claim:

1. In a feed means for fruit and the like articles, a frame, bulk fruit feed means supported on said frame, an upstanding side wall on said frame extending along one edge of said feed means and having an exit opening therein, means for preventing bridging of said exit opening by fruit comprising a pair of upright rollers defining the respective upstream and downstream sides of said exit opening, means mounting each of said rollers for movement on said frame, means urging each roller independently toward said bulk fruit feed means, each roller having a driven element for engaging said bulk fruit feed means, and movable means defining the top of said exit opening and being driven to cooperate with the moving rollers in preventing bridging of said exit opening by larger fruit articles.

2. In a feed means for fruit and the like articles, a frame, a bulk fruit conveyor supported for movement on said frame, a side wall on said frame having an exit opening therein, means for preventing bridging of said exit opening by fruit comprising a pair of upright rollers defining the respective upstream and downstream sides of said exit opening, means mounting each of said rollers for movement on said frame, means urging each roller independently toward said conveyor, each roller having a driven element for engaging said conveyor, and an endless conveyor extending between said rollers adjacent the upper ends thereof and defining the height of said exit opening.

3. In a bulk feed means for fruit and the like articles, a frame, a bulk fruit conveyor supported for movement on said frame, a side wall on said frame having an exit opening therein, means for preventing bridging of said exit opening by fruit comprising a pair of upright rollers defining the respective upstream and downstream sides of said exit opening, means mounting each of said rollers for movement on said frame about a pivotal axis adjacent its upper end, means urging each roller independently toward said conveyor, each roller having a driven element for engaging said conveyor, and an endless conveyor extending between said rollers adjacent the upper end thereof and defining the height of said exit opening.

4. In a feed means for fruit and like articles, a frame, bulk fruit feed means supported on said frame comprising a conveyor belt providing a generally horizontal conveying surface, an upstanding side wall on said frame disposed to extend along one edge of said belt immediately adjacent said conveying surface to retain articles on said belt, said side wall having an opening formed therein, movable means mounted adjacent and coinciding with said wall opening and defining an upright exit opening for receiving fruit discharging laterally from said belt through said wall opening, said movable means having moving portions disposed at each side and across the top of said exit opening, each portion presenting an exposed moving surface along a segment of the perimeter of said exit opening, said movable means being driven to move said exposed moving surfaces to cooperate with fruit on said conveying surface in preventing bridging of said exit opening by the fruit with the exposed moving surface across the top of said exit opening assisting in maintaining the exit opening free from blockage by fruit larger than said exit opening.

5. In a feed means for fruit and like articles, as defined in claim 4, in which said moving portions converge inwardly and downwardly toward said belt at the lower portion of said exit opening to provide a centering action on fruit as it moves through said exit opening.

6. In a feed means for fruit and the like articles, a frame, bulk fruit feed means supported on said frame, a side wall on said frame having an exit opening therein, and movable means defining the two sides and the top of said exit opening to present moving surfaces to fruit attempting to pass through said opening, said movable means at the upstream side of the opening moving in a direction to cause the opening defining surfaces thereof to have a component of movement in a direction away from said feed means and the movable means at the downstream side of the opening moving in a direction to cause the opening defining surfaces thereof to have a component of movement in a direction towards said feed means, and said movable means extending across the top of said opening presenting its surfaces moving in the same direction as said bulk fruit feed means.

References Cited in the file of this patent
UNITED STATES PATENTS

| 2,047,106 | Lidberg | July 7, 1936 |
| 2,581,732 | Thompson | Jan. 8, 1952 |

FOREIGN PATENTS

| 111,051 | Great Britain | July 15, 1940 |